United States Patent [19]

Rannenberg

[11] E Patent Number: Re. 32,100

[45] Reissued Date of Patent: Apr. 1, 1986

[54] EFFICIENCY AIR CYCLE ENVIRONMENTAL CONTROL SYSTEM

[75] Inventor: George C. Rannenberg, Canton, Conn.

[73] Assignee: United Technologies Corporation, Hartford, Conn.

[21] Appl. No.: 508,208

[22] Filed: Jun. 27, 1983

Related U.S. Patent Documents

Reissue of:

[64] Patent No.: 4,209,993
Issued: Jul. 1, 1980
Appl. No.: 949,605
Filed: Oct. 10, 1978

U.S. Applications:

[63] Continuation-in-part of Ser. No. 884,295, Mar. 6, 1978, abandoned.

[51] Int. Cl.[4] ..... F25D 21/00; F25D 9/00

[52] U.S. Cl. ..... 62/80; 62/239; 62/241; 62/402

[58] Field of Search ..... 62/80, 239, 241, 402

[56] References Cited

U.S. PATENT DOCUMENTS

| | | | |
|---|---|---|---|
| 2,618,470 | 11/1952 | Brown et al. | 62/239 |
| 2,786,341 | 3/1957 | Green | 62/241 |
| 2,800,002 | 7/1957 | Seed | 62/241 |
| 2,930,205 | 3/1960 | Walker | 62/241 |
| 3,199,578 | 8/1965 | Rogers | 62/241 |
| 3,208,234 | 9/1965 | Messinger | 62/241 |
| 4,127,011 | 11/1978 | Giles et al. | 62/402 |

*Primary Examiner*—Lloyd L. King
*Attorney, Agent, or Firm*—John Swiatocha

[57] ABSTRACT

In a compressed air powered refrigeration system for aircraft containing a refrigeration turbine and associated heat exchangers for supplying cool air to the aircraft cabin, air is recirculated from the cabin by a recirculation means and combined with the turbine discharge air to simultaneously melt ice present in the turbine discharge and provide cooling to the recirculated air. The lack of ice in the turbine discharge allows the use of an ice-free regenerative heat exchanger, in heat exchange relation with the mixture of the turbine discharge air and recirculated cabin air, to condense moisture from the air entering the turbine. The use of heat from the cabin air to melt ice coupled with maximum utilization of the recirculation means supplying the recirculating cabin air enables the turbine to provide air at a temperature below freezing and results in improved cycle efficiency as well as maximum possible ventilation rate to the load.

20 Claims, 2 Drawing Figures

EFFICIENCY AIR CYCLE ENVIRONMENTAL CONTROL SYSTEM

Matter enclosed in heavy brackets [ ] appears in the original patent but forms no part of this reissue specification; matter printed in italics indicates the additions made by reissue.

BACKGROUND OF THE INVENTION

This is a continuation-in-part of U.S. application Ser. No. 884,295, filed Mar. 6, 1978, now abandoned.

1. Field of Invention

This invention relates to turbine driven air cycle refrigeration systems for providing cooling air to aircraft cabins or other loads, and more particularly to a system in which a large volume of air recirculated from the cabin by a fan or ejector is used to prevent icing in the turbine discharge and downstream ducting, permitting the use of an ice-free regenerative heat exchanger to condense moisture from air entering the turbine. Improved cycle efficiency is attained by effective utilization of the recirculation means, a design which provides the maximum possible ventilation rate to the load, and the ability to efficiently utilize high supply air pressures.

2. Description of the Prior Art

As the cost and availability of fuel become significant factors in the operation of aircraft, improved efficiency of operation of aircraft components is more desirable in order to conserve available energy. One of the systems in modern day aircraft which consumes significant power is the air cycle environment control system. Increased efficiency in this system will result in large fuel savings. A major obstacle to improving air cycle system efficiency has been the clogging produced by ice which forms in the turbine discharge and downstream ducting of the air cycle refrigeration systems. The maximum supply pressure level which could be used was that pressure which produced icing at the turbine discharge, and the cooling provided by any higher pressure was of necessity wasted because of de-icing controls required to prevent the ice. Consequently, all the pressure energy available in the compressed supply air could not be efficiently utilized due to the icing problems.

In an attempt to overcome limitations of the air temperature at the turbine outlet to prevent the formation of ice, some current air cycle refrigeration systems recirculate a small amount of air from the load and mix the recirculated air at a junction with the turbine discharge. A system such as this is presently incorporated in the "S-76" helicopter produced by the Sikorsky Aircraft Division of United Technologies Corporation. This approach has the advantage of being able to utilize very cold turbine discharge temperatures to reduce the required flow of compressed air, and also provides maximum possible ventilation rate through the load since the full sum of the recirculation flow plus the compressed air supply flow is used for cabin ventilation. One disadvantage of a system of this type is its reliance on simple scuppers at the turbine inlet and in the load distribution line to remove moisture from the air supply, a technique which is inadequate to remove large quantities of moisture.

Other air cycle refrigeration systems utilize a regenerative heat exchanger in the supply air path upstream of the turbine inlet to condense moisture at the turbine inlet and thereby avoid problems caused by the conventional coalescer-type water separator. A regenerative heat exchanger of this type is used in the Bell "Huey Cobra" helicopter having an air conditioning system manufactured by AiResearch. A disadvantage of this type of system is its inability to utilize very cold turbine discharge temperatures due to icing problems in the regenerative heat exchanger.

U.S. Pat. No. 4,127,011 uses recirculated air to raise the temperature of the turbine outlet air, a water extractor, and a regenerative heat exchanger for additional cooling of the supply air, and avoids the formation of ice at the outlet of the expansion turbine by heating the outside of the turbine wall with supply air. This system, however, does not provide maximum ventilation rate to the load since a portion of the turbine outlet air is recirculated through the regenerative heat exchanger, thereby making the recirculation air power source unnecessarily large for a given ventilation rate.

Other current air cycle refrigeration systems utilize recirculation of air from the load which is mixed with the air provided by the compressed air supply prior to supply of the air to the load. This technique had the advantage of supplying a ventilation rate to the load equal to the sum of the compressed air supply and the recirculated air. A system of this type is incorporated in the Boeing 747 aircraft. An advantage of this system is that maximum cabin ventilation rate is provided for a fixed recirculation fan capacity. Fully utilizing the recirculation fan flow reduces the parasitic heat load of the recirculation fan input power and therefore produces the maximum efficiency possible from the recirculation loop of the cycle. Unfortunately this type of system cannot fully utilize the total pressure energy in the pressurized supply air source because of the icing produced by the sub-freezing temperatures at the turbine outlet and downstream ducting.

Many current air cycle refrigeration systems use a de-ice control valve, modulated open as necessary, to supply warm air from upstream of the turbine inlet to the turbine outlet in order to prevent ice from collecting and causing blockage downstream of the turbine outlet. The Boeing 747 aircraft uses this type of system.

The present invention overcomes the limitations and disadvantages of the prior art air cycle refrigeration systems and provides a system having the highest possible efficiency in terms of maximum refrigeration and maximum ventilation for the load. The system may be designed for either more flow to the load for a given input power, or for the same flow to the load using less input power.

SUMMARY OF THE INVENTION

It is an object of the present invention to provide an aircraft environmental control system which is highly efficient and which consumes far less power than prior art systems.

Another object of the present invention is an air cycle refrigeration system which uses recirculated air from the load mixed with the cooled air from the expansion turbine to simultaneously melt any ice present at the outlet of the turbine and provide useful cooling to the recirculated air.

A further object of the present invention is an air cycle refrigeration system in which moisture is removed from the supply air at a point upstream of the expansion turbine, and at a temperature sufficiently high to avoid icing problems in the mositure removal component.

Another object of the present invention is an air cycle refrigeration system which uses the total sum of the recirculation air flow plus the compressed air supply to provide the maximum possible ventilation rate to the load.

A further object of the present invention is an air cycle refrigeration system in which ice is prevented from clogging the moisture removal component by adding heat as required from a warm air source upstream of the turbine to the turbine discharge air prior to the entry of the turbine discharge air into the cold side of the moisture removal component.

In accordance with the present invention, there is provided an air cycle refrigeration system in which conventional elements are conbined in a novel manner to overcome the disadvantages of the prior art and at the same time achieve a significant reduction in the use of energy. Air is recirculated from the load by a fan or an ejector and fed to the turbine outlet in order to usefully de-ice sub-freezing turbine discharge temperatures. A regenerative heat exchanger is used to condense moisture from the air entering the turbine. The fan or ejector used in the manner of this invention provides the highest possible cabin ventilation rate with minimum recirculating flow, and therefore minimum power consumption to provide the recirculating flow. A de-ice control valve is utilized to add warm air as required to the turbine discharge, the ice sensing sensor for controlling the de-ice valve being located downstream from the recirculation air junction as well as donwstream from the warm air junction, the warm air being added to protect the regeneration heat exchanger from icing only if the recirculated air is insufficient in heat content to completely de-ice the turbine outlet.

DESCRIPTION OF THE PREFERRED EMBODIMENT

With respect to the Figures, the elements essential to practicing the invention include an expansion turbine for providing cooling to a source of high pressure air, a recirculation duct including a fan or ejector for recirculating air from the cabin or load and mixing the recirculated air with the cool air at the turbine outlet, a moisture removal component for removing moisture from the air before it is expanded in the turbine, and a means for adding additional warm air to the turbine outlet if the recirculated air is insufficient to adequately melt any ice present at the turbine outlet. Additional peripheral equipment such as heat exchangers, flow control valves, compressors and ducting are shown to illustrate preferred embodiments of the invention and the best modes contemplated for practicing the invention, although various changes in the specific construction and arrangement of the components, particularly the peripheral equipment, will be apparent to those skilled in the art.

Figure 1:
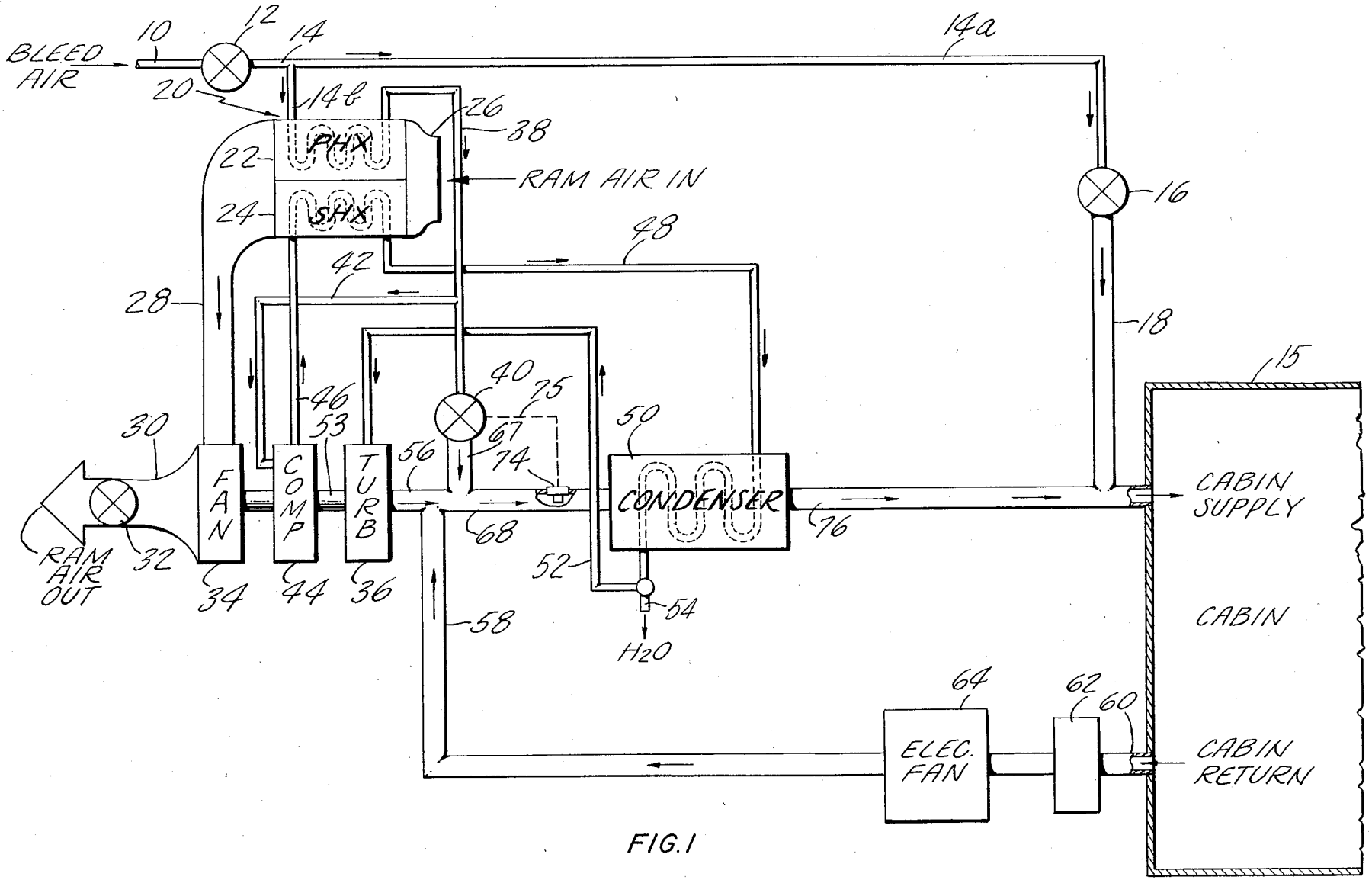
FIG. 1 is a generally schematic view of an environmental control system using high pressure supply air and recirculated cabin air to provide conditioned air for an aircraft cabin.

Referring to FIG. 1, there is shown a turbine 36 which expands therethrough high pressure, generally high temperature supply air from an inlet duct 10 to provide cooling to the supply air by way of expansion in the turbine. Air is recirculated from the load, illustrated as cabin 15, via a conduit 58, and combined with the cool air at the turbine outlet in a conduit 56 so that the mixing of the two streams both melts ice present in the turbine discharge, and simultaneously provides useful cooling to the recirculated air. The mixed airstream is fed via a conduit 68 into a regenerative heat exchanger, shown as condenser 50, which connects through heat transfer surfaces the supply air, fed from inlet duct 10 via ducts 14, 14b, 38, 42, 46, 48 and 52 to the turbine inlet, with the cold air of the turbine discharge in conduit 68 downstream of the recirculating air junction, the supply air being cooled in the condenser below its dewpoint so that moisture is condensed for removal in a mechanical water separator upstream of the turbine inlet. The quantity of the airflow leaving the condenser 50 on the cold side thereof, and subsequently ducted to the cabin 15 via a conduit 76, is equal to the sum of air supply plus the recirculation airflow in conduit 58. The recirculation airflow is provided in FIG. 1 by an electric fan 64 and produces to the maximum extent possible the highest possible cabin ventilation rate with the minimum power supplied to the electric recirculation fan 64. When less than full cooling capacity is demanded, or when the recirculated air from the cabin in conduit 58 is insufficient to remove the ice from the outlet of the turbine 36, ice is prevented in the turbine outlet and downstream ducting, including the condenser 50, by a de-ice control valve 40 through which warm air is supplied to the turbine discharge via a conduit 67. An ice sensing sensor 74 is positioned in the conduit 68 downstream from the junction of the recirculated air in conduit 58, and downstream from the warm air junction in conduit 67, the ice sensing sensor 74 detecting when the air in conduit 68 approaches freezing. In the preferred embodiment, the icing sensor 74 is a pressure or temperature sensor, regulating the air temperature at the input into the cold side of condenser 50 to prevent ice. It is understood that other means for sensing ice such as vibrating cylinders, clogging pneumatic orifices, and the like, may also be used. When the occurrence of ice is sensed, the de-ice control valve 40 is opened by a signal on line 75 to add warm air from upstream of the turbine to the turbine discharge at a point upstream of the entry of the air mixture into the cold side of the condenser 50. The de-ice control valve 40 protects the condenser 50 from icing, but only after the recirculating air in conduit 58 has been fully utilized for this purpose.

The remainder of the air cycle refrigeration system of the Figures comprises conventional components arranged in a manner to enhance the operation of the previously described system. The source of supply air for the refrigeration system, not shown, may be the compressor of a gas turbine engine, or an auxiliary power unit, or both, and supplies relatively high temperature, high pressure air via inlet duct 10 into a flow control valve 12. The valve 12 is typically a butterfly valve and serves to regulate the pressure and flow rate of the supply air into the refrigeration system.

The supply air leaves valve 12 via line 14, and is split into two independent ducts, the duct 14a passing the supply air through a zone trim valve 16 and then through a conduit 18, the warm supply air being mixed as required with the conditioned air in conduit 76 in accordance with a temperature control thermostat or the like, not shown, in the cabin supply ducts or cabin, which regulates the position of valve 16 to control the temperature of the air supplied to the cabin 15. In general, the mixing of the warm air with the cooled air to provide the desired cabin temperature can occur at any convenient location in the supply ducts, and the warm air can be provided from any convenient source. The supply air is also fed via duct 14b to a dual heat exchanger 20 comprising a primary heat exchanger portion 22 and a secondary heat exchanger portion 24. The purpose of the dual heat exchanger 20 is to cool the warm supply air, the cooling being produced by a common secondary flow path in the heat exchanger 20 which is typically supplied with ram air via an inlet 26 on the outside of the aircraft, or air bled from the inlet of a turbine engine. The secondary air, which is at ambient temperature and much cooler than the supply air, passes through the primary and secondary heat exchangers 22 and 24, and is evacuated from the aircraft via exit conduits 28 and 30. A control valve 32 may be situated in conduit 30 to regulate the flow of secondary air through the heat exchanger 20. A fan 34, powered by turbine 36, may be mounted in the secondary airflow conduit 28 to maintain a continuous flow of secondary air through the heat exchanger 20 at all times.

The supply air in duct 14b initially passes through the primary heat exchanger 22 where cooling is provided by the secondary air. The precooled supply air then exits from the primary heat exchanger 22 via duct 38. Assuming that the temperature control valve 40 in line 38 is closed indicating a need for full cooling capacity, all of the pre-cooled supply air in duct 38 then passes through duct 42 and into a compressor 44. The compressor is also driven via a mechanical connection with turbine 36. Since valve 40 is closed when maximum cooling is being produced, the efficiency provided by this invention would not be reduced if the warm air for cabin temperature regulation provided via duct 14a, valve 16 and conduit 18 were introduced into conduits 56 or 68 instead of conduit 76 as shown in the Figure.

The supply air exits from the compressor 44 via duct 46 and then passes through the secondary heat exchanger 24 where it is again cooled by heat exchange with the secondary air. The temperature of the air leaving the high pressure side of the secondary heat exchanger 24 may be below its dewpoint, so that a portion of the moisture in the air may be condensed and removed from the system at this point.

The supply air leaving the secondary heat exchanger 24 then passes via duct 48 into the previously described regenerative heat exchanger, condenser 50, where any remaining moisture in the air is removed therefrom by virtue of indirect heat exchanger in the condenser with the cool air in conduit 68. The moisture removed from the supply air may be drained from the system via valve 54 in duct 52. If desired, the water thus collected may be sprayed into the secondary airstream immediately upstream of the heat exchanger 20 to increase the overall cooling capacity of the system.

The supply air leaving condenser 50 via duct 52 is then fed into the turbine 36 where it is expanded and cooled. The amount of cooling provided to the supply air by the turbine is a function of the pressure of the supply air, and as the air pressure increases, the temperature of the air at the turbine outlet becomes colder due to the increased turbine pressure ratio. The turbine also provides mechanical power to drive the fan 34 and the compressor 44 as illustrated by shaft 53.

The air cooled by the turbine 36 and fed into the conduit 56 may range in temperature from above freezing to well below freezing. As previously noted, to avoid icing of the turbine outlet and downstream ducting, the recirculated cabin air in conduit 58 is mixed with the turbine outlet air in conduit 56, the two airstreams mixing at a point slightly downstream from the turbine exhaust. The recirculated air from cabin 15 is supplied by an inlet duct 60 within the cabin 15, and passed through a suitable filter 62 where carbon dioxide, impurities and some moisture are removed. The electric fan 64 located in conduit 56 is sized to produce to the maximum extent possible the largest cabin ventilation rate with minimum recirculation fan power.

If desired, depending upon the particular environmental control system configuration, a portion of the recirculated cabin air in conduit 58 may be shunted via a bypass line, not shown, and having a fixed orifice therein, to be mixed with the air in conduit 76 downstream from condenser 50, the bypass path acting as a flow balancing means to further reduce power requirements for electric fan 64. This modification does not reduce the efficiency of the system since the quantity of the airflow to the cabin is still the sum of the supply air and the recirculated cabin air.

The recirculated cabin air in conduit 58 is typically about 75° F. (24° C.). When mixed with the very cold air from the turbine outlet, the mixture will generally be above freezing and will not cause icing problems in the turbine outlet, downstream condenser and cabin ducting. Under some conditions, however, the heat content of the recirculated air is insufficient to melt ice in the turbine outlet. To insure that no ice occurs, the ice sensing sensor 74 is located in the conduit 68 downstream from the point where the recirculated cabin air in conduit 58 is mixed with the turbine outlet air. Sensor 74, connected to the valve 40 via line 75, will open valve 40 if the temperature of the air in conduit 68 is below a predetermined temperature such as 35° F. (2° C.), or if the presence of ice is sensed. Opening of the valve 40 will permit the warm supply air from the duct 38 to pass through valve 40 and conduit 67 and mix with air in conduit 68 downstream from the junction of the recirculated air in conduit 58 to insure that the temperature in conduit 68 is no lower than about 35° F. (2° C.) so that no ice will be present. Sensor 74 is located downstream from the conduit 67 so that sensor 74 senses the presence of ice or the temperature of the air entering condenser 50, i.e., senses the temperature of the mixture of the turbine outlet air, the recirculated cabin air, and the warm air, if any, fed into conduit 68 via valve 40 and conduit 67. The air in conduit 68, always at a temperature high enough to pervent freezing, is then fed through condenser 50 to act in heat exchange relation with the supply air in line 48 such that moisture in the warm airstream in line 48 condenses.

As noted previously, the air passed to the cabin 15 from condenser 50 via conduit 76 is always the sum of the supply air plus the recirculated cabin air, with no wasted or unnecessary parallel flowpaths to reduce system efficiency. The temperature of the conditioned air is normally above 35° F. (2° C.) because the temperature of the air in conduit 68, which is at least 35° F. (2° C.) or above, rises by the amount of the cold side temperature rise through condenser 50. This is not a disadvantage in most applications since the ultimate effectiveness of the refrigeration system is measured not by the precise temperature of the air supplied to the cabin, but is a function of both temperature and airflow, and the lower the temperature of the air, the less airflow required to provide the desired cabin temperature.

The system as described provides improved cycle efficiency and reduced energy consumption combined with the maximum possible ventilation ratio to the cabin.

Figure 2:
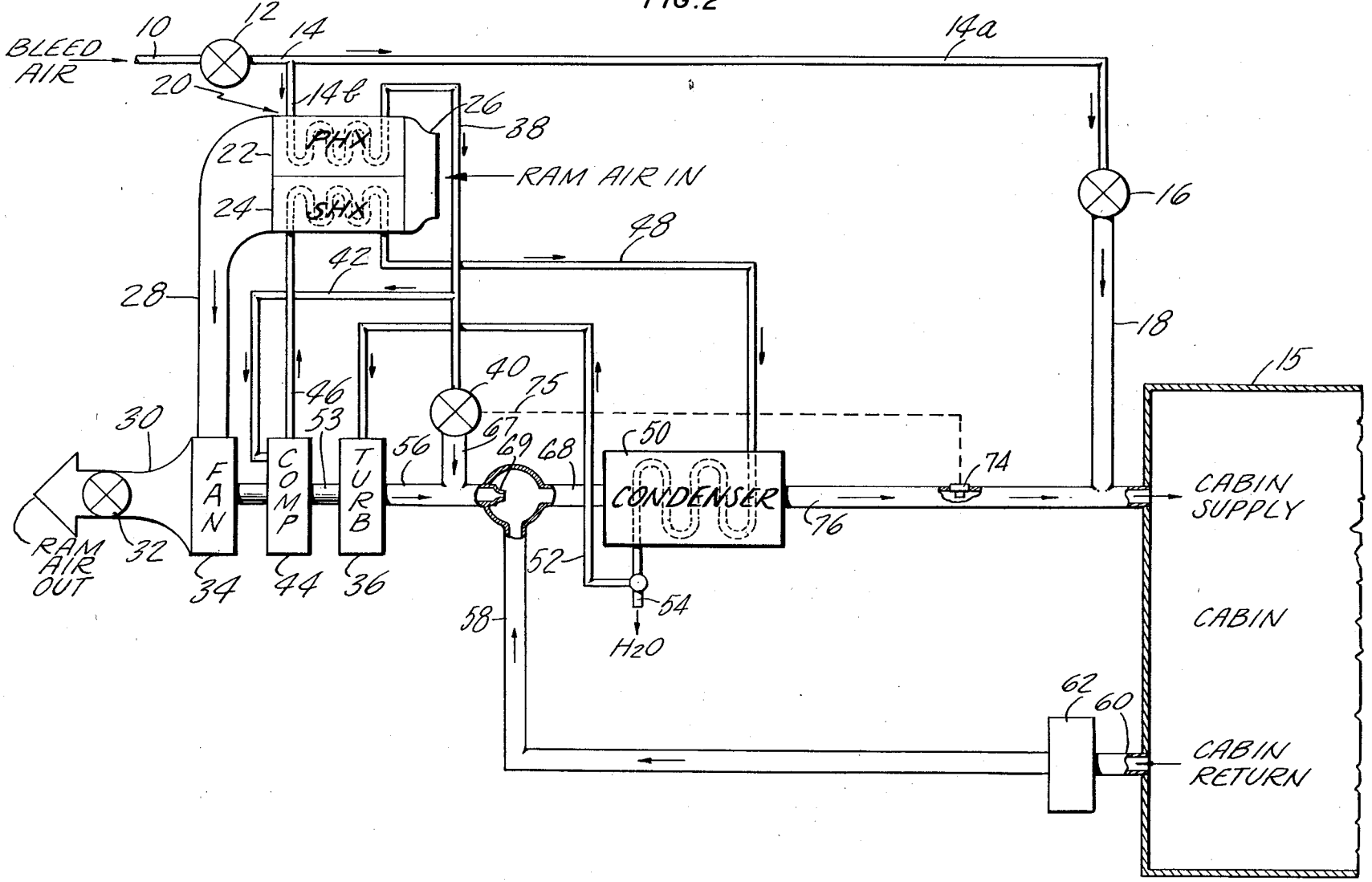
FIG. 2 is a schematic view of another embodiment of the system of FIG. 1.

A modification of the environmental control system is shown in FIG. 2. In this embodiment the sensor 74 has been relocated to a position in conduit 76 downstream of regenerative condenser 50 rather than in conduit 68 upstream of the regenerative condenser. One advantage of this embodiment is that it affords better mixing of the air in conduit 68. A more significant advantage is that when the sensor 74 is a temperature sensor, it is susceptible to the formation of ice thereon when located upstream of the condenser. Of course, this causes valve 40 to open, admitting warm air into conduits 67 and 68, but the ice on the temperature sensor does not melt immediately even though the surrounding air is at a temperature higher than 32° F. (0° C.) and as long as the temperature sensor is coated with ice it will remain at 32° F. (0° C.), holding valve 40 open until the ice on the sensor melts. This may result in a much higher temperature of the air to conduit 68 than is desired, and may produce erratic response in the control system.

With the temperature sensor 74 located in conduit 76, the above problems are avoided. The sensor 74, however, must be set at a temperature such as, for example, 44° F. (7° C.), in order to take into account the temperature rise across condenser 50. In other words, to prevent icing at the turbine outlet and the inlet to condenser 50, a temperature of 35° F. (2° C.) or thereabouts must be maintained in conduit 68, and the air in conduit 68 will rise in temperature as it passes through condenser 50, and setting temperature sensor 74 to open valve 40 when the temperature in conduit 76 falls below about 44° F. (7° C.) will assure that the temperature in conduit 68 will not drop below a temperature which will cause clogging in the airflow path due to icing. Since the temperature rise in condenser 50 will vary slightly depending on factors such as total air flow, bleed air temperature and ram air temperature, the temperature setting of sensor 74 will have to take these factors into account, but the overall result is insignificant since the air in conduit 76 is mixed with warm air from conduit 18 before it is supplied to the cabin.

In FIG. 2 the electric fan 64 has been omitted and replaced by an ejector 69 at the intersection of conduit 58 with conduit 68. Also, the recirculated air is introduced into conduit 68 downstream from conduit 67. It is in fact immaterial where conduits 67 and 58 enter the conduit 68, as long as proper air mixing is provided. The ejector 69 provides the same advantages with respect to efficiency as does the electric fan.

A different concept, of lower efficiency, for accomplishing the general purpose of this invention would be to utilize two recirculation loops in parallel, rather than the single recirculation loop of this invention. For example, one of the parallel recirculation loops would take air returned from the load and mix it with the turbine discharge, and then directly to the cabin supply duct without passing through the cold side of the condenser. The second parallel recirculation loop would take air from the cabin supply duct back through the cold side of the condenser, and then mix it with the turbine discharge. Such "parallel loop" systems are significantly different in configuration and efficiency from that described in this invention, because in all such "parallel loop" systems the load gets the benefit of only one of the recirculation loops, therefore utilizing only a portion of the total recirculation flow. In the system of this invention the load gets the benefit of the total recirculated flow. This is one key to the unique efficiency advantage of this invention.

Having thus described a typical embodiment of my invention, that which I claim as new and desire to secure by Letters Patent of the United States is:

1. In an air cycle refrigeration system for aircraft receiving pressurized air and supplying refrigerated air to an enclosure;

a turbine having an inlet and an outlet, said inlet receiving said pressurized air and said turbine expanding and cooling said air through said outlet;

means for recirculating air at a temperature above freezing from said enclosure to a junction downstream from the outlet of said turbine whereby said recirculated air is mixed with the cool air from said turbine to melt ice present in said turbine outlet and to provide cooling to said recirculated enclosure air;

a regenerative condenser connecting, through heat transfer surfaces within said condenser, the pressurized air upstream of said turbine inlet with the cooled air mixture downstream of said junction, said cooled air mixture absorbing heat from said pressurized air and cooling said pressurized air below its dewpoint so that moisture in said pressurized air condenses on said heat transfer surfaces and is made available for removal;

and means for supplying said cooled air mixture from said regenerative condenser to said enclosure, the quantity of airflow supplied to said enclosure *through said regenerative condenser* being equal to the sum of the pressurized air and the recirculated air.

2. An air cycle refrigeration system as in claim 1 and including means for removing said moisture condensed in said regenerative condenser.

3. An air cycle refrigeration system as in claim 1 and including:

sensing means located upstream from said regenerative condenser and downstream from said junction;

and means responsive to said sensing means for adding to said air mixture upstream from said sensing means and downstream from said turbine outlet sufficient pressurized air at a temperature higher than said air mixture to prevent formation of ice during operating conditions of said system when the recirculated air from said enclosure has insufficient heat content to prevent icing.

4. An air cycle refrigeration system as in claim 3 in which said sensing means is a temperature sensor.

5. An air cycle refrigeration system as in claim 3 in which said sensing means is a pressure sensor.

6. An air cycle refrigeration system as in claim 1 and including:

temperature sensing means located downstream from said regenerative condenser;

and means responsive to said temperature sensing means for adding to said air mixture upstream from said regenerative condenser and downstream from said turbine outlet sufficient pressurized air at a temperature higher than said air mixture to prevent formation of ice during operating conditions of said system when the recirculated air from said enclosure has insufficient heat content to prevent icing.

7. An ice cycle refrigeration system as in claim 1 in which said means for recirculating air from said enclosure includes:

duct means connecting said enclosure with said junction; and electric fan means located in said duct means.

8. An air cycle refrigeration system as in claim 1 in which said means for recirculating air from said enclosure includes:

duct means connecting said enclosure with said junction;

and ejector means located at said junction where said duct means connects with said junction utilizing pressure energy from the turbine outlet to pump said recirculated air.

9. An air cycle refrigeration system as in claim 1 and including:

a source of ambient air;

heat exchange means connecting, through heat transfer surfaces within said heat exchange means, the pressurized air upstream of said regenerative condenser with said ambient air, said ambient air absorbing heat from said pressurized air and cooling said pressurized air;

means for discharging said ambient air from said system;

and means for passing said pressurized air from said heat exchanger means to said regenerative condenser.

10. An air cycle refrigeration system as in claim 9 and including:

fan means powered by said turbine and communicating with said ambient air source and said ambient air discharge means for maintaining a continuous flow of ambient air through said heat exchange means.

11. An air cycle refrigeration system as in claim 9 and further including a compressor powered by said turbine, said compressor receiving said pressurized air and feeding said compressed pressurized air to said heat exchange means.

12. An air cycle refrigeration system as in claim 9 in which said heat exchange means includes a primary heat exchanger and a secondary heat exchanger.

13. An air cycle refrigeration system for an aircraft enclosure comprising:

a source of pressurized air;

a regenerative condenser receiving said pressurized air and removing moisture from said air, said condenser also being supplied with a coolant fluid in heat exchange relationship with said air;

an expansion turbine receiving the pressurized air from said regenerative condenser and lowering the temperature thereof;

means for recirculating air from said enclosure at a temperature above freezing;

means for mixing said recirculated enclosure air with the cooled air discharged from said turbine to maintain said air mixture at a temperature sufficiently high to prevent the formation of ice;

means for passing said air mixture through said regenerative condenser as said coolant fluid;

and means for supplying said air mixture from said regenerative condenser to said enclosure, the quantity of airflow supplied to said enclosure *through said regenerative condenser* being equal to the sum of sid pressurized air and said recirculated air.

14. An air cycle refrigeration system as in claim 13 and including:

sensing means located upstream of said regenerative condenser;

and means responsive to a preselected condition of said sensing means for adding warm air to said air mixture upstream of said sensing means to prevent icing.

15. An air cycle refrigeration system as in claim 14 in which said sensing means is a temperature sensor.

16. An air cycle refrigeration system as in claim 14 in which said sensing means is a pressure sensor.

17. An air cycle refrigeration system as in claim 13 and including:

temperature sensing means located downstream of said regenerative condenser;

and means responsive to a preselected temperature of said temperature sensing means for adding warm air to the air mixture between said turbine discharge and said regenerative condenser to prevent icing.

18. A method for cooling an aircraft enclosure from a source of pressurized air comprising the steps of:

removing moisture from said pressurized air by heat exchange in a regenerative condenser between said pressurized air and a coolant fluid;

expanding said pressurized air, after removal of moisture therefrom, through a turbine to cool said air;

mixing air recirculated from said enclosure with said cooled air at the outlet of said turbine so that the resultant air mixture prevents ice in said turbine and cools said recirculated air;

passing said air mixture through said regenerative condenser as said coolant fluid;

and supplying said air mixture from said regenerative condenser to said enclosure, said air mixture *supplied to said enclosure through said regenerative condenser* being equal to the sum of said pressurized air and said recirculated air.

19. The method of claim 18 and further including the steps of:

sensing a condition of the air mixture upstream of said regenerative condenser;

and adding to said air mixture at a point downstream of the turbine outlet and upstream of the regenerative condenser a sufficient amount of warm air to prevent icing when the sensed condition of said air mixture is such as to cause icing.

20. The method of claim 18 and further including the steps of:

sensing the temperature of the air mixture downstream of said regenerative condenser;

and adding to said air mixture at a point downstream of the turbine outlet and upstream of the regenerative condenser a sufficient amount of warm air to prevent icing therein at preselected temperature of the air mixture downstream of said regenerative condenser.

* * * * *